United States Patent [19]

Kovach

[11] 4,256,676

[45] Mar. 17, 1981

[54] PROCESS FOR PREPARING POROUS METAL OXIDE BEADS

[76] Inventor: Julius L. Kovach, 2948 Brookdown Dr., Worthington, Ohio 43085

[21] Appl. No.: 962,976

[22] Filed: Nov. 22, 1978

[51] Int. Cl.$^3$ .............................................. B21C 21/00
[52] U.S. Cl. ........................................ 264/0.5; 264/9; 264/29.1; 264/29.4; 264/29.6; 264/29.7
[58] Field of Search .................. 264/0.5, 9, 29.1, 29.4, 264/29.6, 29.7

[56] References Cited

U.S. PATENT DOCUMENTS

| | | | |
|---|---|---|---|
| 3,309,434 | 3/1967 | Blum et al. | 264/0.5 |
| 3,716,605 | 2/1973 | Grimes et al. | 264/0.5 |
| 3,792,136 | 2/1974 | Schmitt | 264/29.1 X |

FOREIGN PATENT DOCUMENTS

| | | | |
|---|---|---|---|
| 2541956 | 4/1976 | Fed. Rep. of Germany | 264/0.5 |
| 994146 | 6/1965 | United Kingdom | 264/0.5 |
| 1362786 | 8/1974 | United Kingdom | 264/0.5 |

*Primary Examiner*—Leland A. Sebastian
*Attorney, Agent, or Firm*—Jerry K. Mueller, Jr.; Gerald L. Smith

[57] ABSTRACT

A mixture of powdered metal oxide and thermally decomposable organic binder is formed into particles or beads of a controlled size. The beads are heated to a temperature sufficient to decompose the binder to carbon or to oxidize it completely. If desired, porosity control agents, such as starch, may also be included in the original mixture.

19 Claims, No Drawings

PROCESS FOR PREPARING POROUS METAL OXIDE BEADS

NATURE OF THE INVENTION

This invention relates to the production of porous beads. More specifically it is concerned with the production of porous beads made up primarily of metal oxides useful as catalysts, adsorbents, reactive solids for liquid phase and gas phase reactions and as composites of fissile materials.

BACKGROUND OF THE INVENTION

A number of methods are currently used to prepare bead-like material having a porous structure, particularly beads comprising mainly metal oxides. These methods generally consist of depositing metal salts from solution onto beads of ion exchange resins and subsequently decomposing the resin under controlled conditions to yield porous metal oxide beads. These processes are, however, not satisfactory. The ratio of acceptable bead material to the starting materials is only about 1 to 20, thus making the finished product expensive. The preparation of large diameter beads is particularly difficult.

A primary object of this invention is to provide an improved method for making porous beads comprising primarily metal oxides or composites of metal oxides and carbonaceous material.

SUMMARY OF THE INVENTION

Briefly stated this invention constitutes a process for making porous beads comprising the steps of:
(a) mixing a powdered metal oxide and a thermally decomposable organic binder;
(b) forming the resultant mixture into particles or beads of a controlled size; and
(c) heating the particles to a temperature at least sufficient to decompose the binder into carbonaceous material.

In another aspect this invention comprises a bead-like product produced by the aforedescribed process.

DESCRIPTION OF THE INVENTION

The metal oxides used in the process of this invention can be any of the metal oxides which are useful as adsorbents, catalysts, fissile materials, or as reaction sites for liquid phase and gas phase reactions. Preferred metal oxides are iron oxide ($Fe_2O_3$), thoria, manganese oxide ($MnO_2$), and vanadium oxide ($V_2O_5$) and mixtures of one or more of these. The powdered metal oxides preferably have a particle size of less than 20 microns. In some instances the use of a metal oxide powder of a larger particle size is possible.

The thermally decomposable organic binder can be any of a number of monomers of thermosetting polymers such as styrene, divinyl benzene, and furfuryl alcohol. Liquid phenol formaldehyde resin binders can also be used. Of these binder materials the most preferred is styrene.

In some instances it is desirable to add a porosity expanding or porosity control agent. Porosity expanders serve to increase and to control the amount of void space in the final product. Preferably they are made up only of the chemical elements, carbon, oxygen, hydrogen, and nitrogen. They should decompose (char) without melting and should be free of contaminants such as sulfur or chlorine. Porosity expander and control agents which can be used include powdered starch, sugar, cellulose, wood flour and mixtures of these. Of these the preferred agent is starch.

To make the porous bead material, the powdered metal oxide and thermally decomposable binder first are mixed in a ratio of between 10 and 30 parts by weight of binder to 100 parts of metal oxide powder, or preferably in a ratio of between 15 and 25 parts by weight of binder to 100 parts of metal oxide powder. If a porosity control or expander agent is to be used, it is also blended into the mixture in a ratio of between 20 and 60 parts by weight of metal oxide, and preferably in a ratio of between 40 and 60 parts per 100 parts of metal oxide. The mixture is then formed into beads by rolling the metal oxide-binder mixture on sieves of sufficient mesh size to produce beads between 8 and 40 mesh size ASTM. The beads are then dried by exposing them to air and are then heated to a temperature sufficient to cure the thermosetting resin. The beads can then be handled more easily. The beads are then heated to a temperature of up to 350° C. At this temperature the thermosetting binder and porosity control agent decompose and the resulting product is a mass of free-flowing bead-like material which is a composite of carbon and metal oxide.

In some instances it is desirable to form beads having a composition consisting of metal oxide only. In that circumstance the beads are heated further to a temperature of up to 900° C. in an oxidizing atmosphere (such as gaseous oxygen or air) until all carbonaceous material is consumed leaving only a porous bead made up of metal oxide alone. If iron oxide of the $Fe_2O_3$ form has been used in the original mixing operation, further heating can be done under vacuum to convert the iron oxide to $Fe_3O_4$.

The product obtained either by heating only to carbonize the binder and porosity control agent, if the latter is present, or the product obtained by further oxidizing the carbonaceous material is a bead-like material having a hard, free-flowing, smooth, spherical or near spherical shape of closely controlled particle size. The volume of finished porous bead-like material in relation to the volume of starting material is on the order of 2:3 to 1:3, a substantial improvement over the prior art methods of making similar bead-like material.

In the process of this invention the heating steps from the initial polymerizing to the step of oxidizing all carbonaceous material can be done in one continuous step.

Of the foregoing procedure the best mode of conducting the process known to the inventor is to use a metal oxide combined with a styrene binder and powdered starch as the porosity control agent, if the latter is desirable. The best procedure of forming the beads from this mixture is by rolling the mixture on a sieve, such as a gyrating sieve, a procedure known to those skilled in the art. The best temperature for the initial carbonizing step is 350° C. and the best temperature for oxidizing the carbonaceous material is 900° C.

EXAMPLE 1

Powdered iron oxide ($Fe_2O_3$) of analytical grade was thoroughly blended with powdered starch in a weight ratio of 2 parts of iron oxide to 1 part of starch. A liquid mixture of styrene and divinyl benzene was then added to the powder mixture in a ratio of 4 parts by weight of dry mixture to 1 part by weight of liquid monomer. The resulting mixture was placed in a gyrating screen and shaken for 30 minutes. The mesh size of the screen was sufficient to produce beads of approximately 8 to 40 mesh ASTM sieve size. The bead-like mixture was air dried and first heated to a temperature of 100° C. and subsequently was heated to a temperature of 350° C. in contact with air. The resulting carbon oxide composite beads finally were sintered at 900° C. Under these latter conditions the carbon was completely removed leaving a high purity, hard, porous bead-like material comprising $Fe_2O_3$.

EXAMPLE 2

The procedure of Example 1 was repeated except that the product obtained was heated further under vacuum to a temperature of 1300° C. to convert the $Fe_2O_3$ to $Fe_3O_4$.

EXAMPLE 3

The mixing procedure, bead forming, and air drying procedure of Example 1 were repeated. The beads were then first heated to a temperature of 100° C. to polymerize the binder and were then heated to a temperature of 900° C. in an atmosphere of $CO_2$ thereby forming a porous bead made up of activated carbon and a mixture of $Fe_2O_3$ and $Fe_3O_4$.

EXAMPLE 4

The mixing procedure, bead forming, and air drying procedure of Example 1 were repeated. The beads were then first heated to a temperature of 100° C. to polymerize the binder and were then heated to a temperature of 900° C. in an atmosphere of $CO_2$ and CO. The resulting bead product was a composite of activated carbon and $Fe_3O_4$.

EXAMPLE 5

The same procedure was followed as in Example 1 was repeated except that the metal oxide was thoria.

EXAMPLE 6

The same procedure was followed as in Example 1, was repeated except that the metal oxide was manganese oxide ($MnO_2$).

EXAMPLE 7

The same procedure was followed as in Example 1, was repeated except that the metal oxide was vanadium oxide.

EXAMPLE 8

The same procedure was followed as in Example 1, was repeated except that the binder was furfuryl alcohol.

EXAMPLE 9

The same procedure was followed as in Example 1, was repeated except that the porosity control agent was powdered cellulose.

I claim:

1. A process for making porous bead-like material of controlled particle size comprising the steps of:
   (a) mixing a powdered metal oxide and a thermally decomposable organic binder comprising a monomer of a thermosetting polymer;
   (b) forming the resulting mixture into particles of a uniform particle size; and
   (c) heating the particles to a temperature sufficient to convert the organic binder to carbonaceous material.

2. The process of claim 1 wherein said mixing step further comprises the inclusion of a powdered organic porosity control agent selected from the group consisting of sugar, starch, cellulose, and wood flour.

3. The process of claim 1 wherein said thermally decomposable binder is selected from the group consisting of styrene, divinyl benzene, furfuryl alcohol, liquid phenol formaldehyde resins, and mixtures thereof.

4. The process of claim 1 wherein said binder is polymerizable and said step of heating comprises:
   (c1) heating said formed particles of step (b) at a temperature sufficient to polymerize said binder; and
   (c2) further heating said particles to a temperature sufficient to convert said binder to carbonoceous material.

5. The process of claim 1 wherein said step of forming comprises rolling said mixture on a sieve of a selected mesh size.

6. The process of claim 4 where said step of further heating (c2) is conducted in an atmosphere comprising carbon dioxide or a mixture of carbon dioxide and carbon monoxide.

7. The process of claim 4 wherein said step of further heating (c2) is followed by a step of additional heating in an oxidizing atmosphere, thereby oxidizing said carbonaceous material to CO and $CO_2$.

8. The process of claim 4 wherein the temperature of said step of heating (c1) to polymerize said binder is up to about 100° C.

9. The process of claim 4 wherein said step of heating (c2) to convert said binder to carbonaceous material is conducted at a temperature of up to about 350° C.

10. The process of claim 7 wherein said additional step (d) of heating is conducted in the absence of an oxidizing atmosphere under a pressure of less than atmospheric pressure.

11. The process of claim 1 or 2 wherein said metal oxide is selected from the group consisting of $Fe_2O_3$, thoria, manganese oxide, vanadium oxide, and mixtures thereof.

12. The process of claim 1 wherein the powdered metal oxide and binder are mixed in a ratio of between about 10 and 30 parts by weight of binder to 100 parts of metal oxide powder.

13. The process of claim 12 wherein the powdered metal oxide and binder are mixed in a ratio of between about 15 and about 25 parts by weight of binder to 100 parts of metal oxide powder.

14. The process of claim 2 wherein the ratio of porosity control agent to metal oxide is between about 20 and about 60 parts by weight of control agent to 100 parts by weight of metal oxide.

15. The process of claim 14 wherein the ratio of porosity control agent to metal oxide is between about 40 and about 60 parts by weight of control agent to 100 parts by weight of metal oxide.

16. The process of claim 7, 9, or 10 wherein said step (d) of additional heating is at a temperature of about 900° C.

17. The process of claim 16 wherein said metal oxide is selected from the group consisting of $Fe_2O_3$, thoria, manganese oxide, vanadium oxide, and mixtures thereof; said mixing step further comprises the inclusion of a powdered organic porosity control agent selected from the group consisting of sugar, starch, cellulose, and wood flour; said binder is selected from the group consisting of styrene, divinyl benzene, furfuryl alcohol, a liquid phenol formaldehyde resin, and mixtures thereof; the weight ratio of said powdered metal oxide to said binder is between about 10 and 30 parts by weight of said binder to 100 parts of said metal oxide powder; and the weight ratio of said porosity control agent to said metal oxide is between about 20 and about 60 parts by weight of control agent to 100 parts of said metal oxide.

18. The process of claim 1 wherein the particles size of said powdered metal oxide is not substantially greater than about 20 microns.

19. The process of claim 17 wherein the particle size of said metal oxide powder is not substantially greater than about 20 microns.

* * * * *